June 15, 1965 W. W. WIBERG 3,189,204
FORAGE FEED TROUGH ASSEMBLY
Filed Aug. 8, 1963 2 Sheets-Sheet 1

Woodrow W. Wiberg
INVENTOR.

BY *Clarence A. O'Brien*
*and Harvey B. Jacobson*
Attorneys

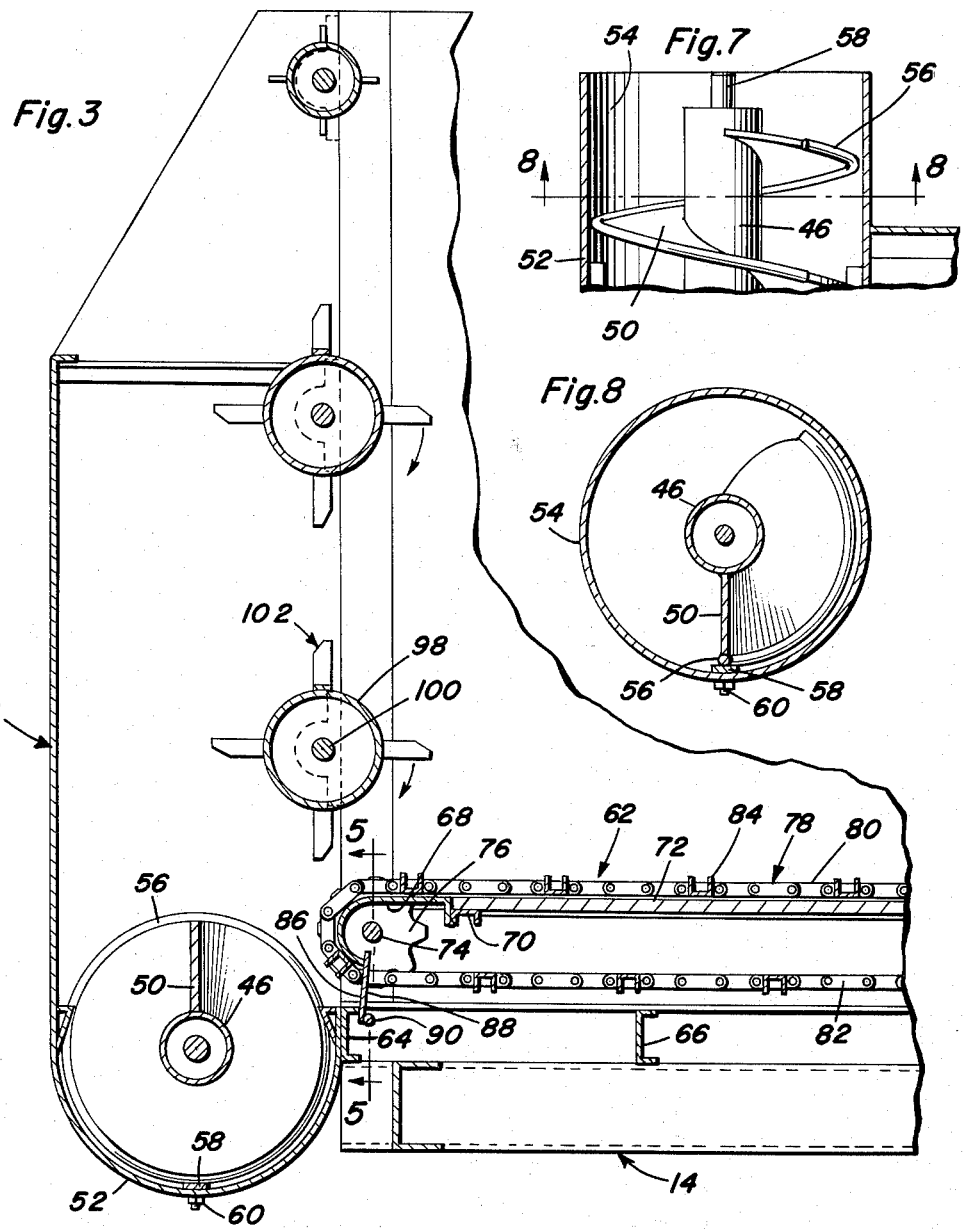
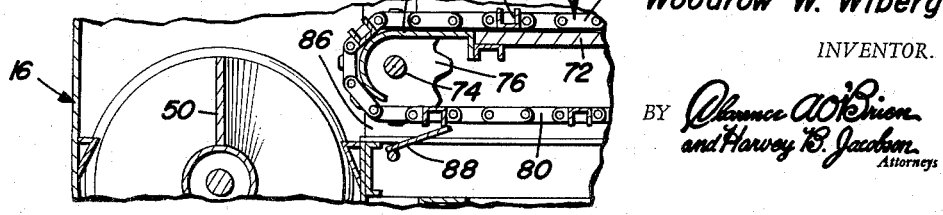

United States Patent Office 3,189,204
Patented June 15, 1965

3,189,204
FORAGE FEED TROUGH ASSEMBLY
Woodrow W. Wiberg, Prairie Farm, Wis.
Filed Aug. 8, 1963, Ser. No. 300,758
2 Claims. (Cl. 214—519)

This invention relates to material handling apparatus and more particularly to a power operated forage feeding device for unloading material such as silage from a hopper or container within which it is stored or transported.

It is therefore a primary object of the present invention to provide mechanism for handling and moving material such as silage, hay, granular matter, etc., with greater efficiency, less loss of material and more smoothly.

In accordance with the foregoing object, the material handling apparatus of the present invention features a novel metering drum and silage feeding arrangement whereby momentary overloading is avoided, flow of material is regulated and wrapping of long grasses on the rotating parts is eliminated so as to prevent clogging and stoppage of the mechanism.

A further object in accordance with the foregoing object, is to provide a cross feed device associated with the conveyor mechanism of a power operated forage feeding apparatus, having facilities for reducing the loss of silage through the gap formed between the cross feed trough and the delivery end of the conveyor, through which gap the material pushing element moves by interconnection with the endless chain drive for the conveyor.

An additional object of the present invention is to provide a novel rotatable bearing arrangement for the cross feed device associated with the silage unloading apparatus whereby the discharge end of the cross feed device may be provided with adequate rotatable support without any substantial reduction in the discharge area at the discharge end of the trough. The foregoing bearing arrangement also involves a readily replaceable bearing strip element facilitating repair and maintenance of the apparatus.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a partial sectional view taken substantially through a plane indicated by section line 3—3 in FIGURE 1.

FIGURE 4 is a partial sectional view showing a portion of the apparatus illustrated in FIGURE 3 in another operative condition.

FIGURE 7 is a partial sectional view taken substantially through a plane indicated by section line 7—7 in FIGURE 1.

FIGURE 8 is a transverse sectional view taken substantially through a plane indicated by section line 8—8 in FIGURE 7.

Figure 1:
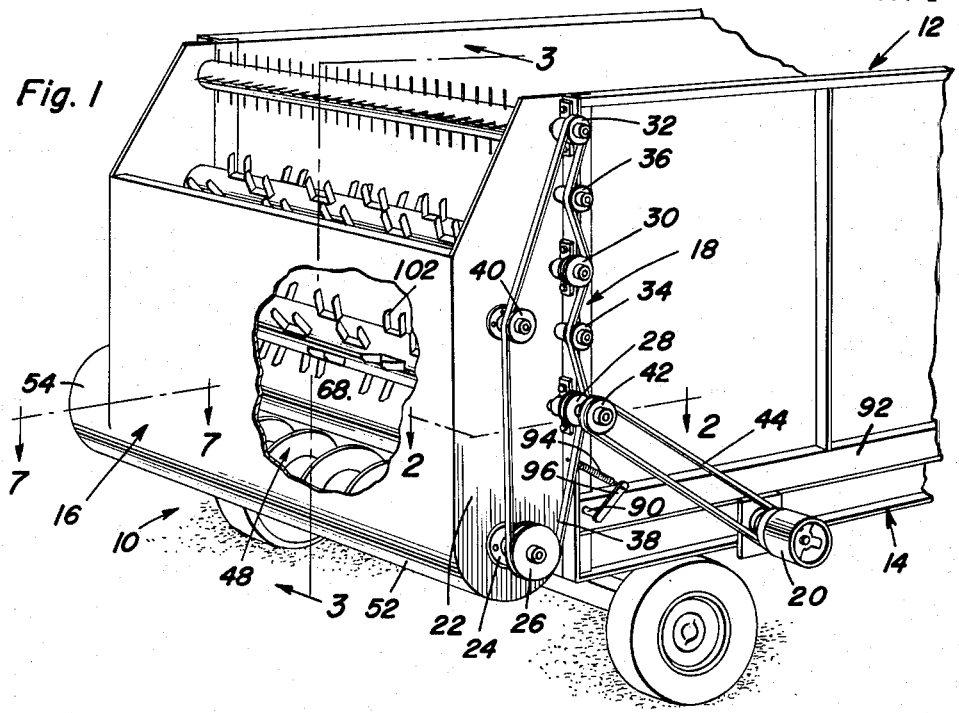
FIGURE 1 is a perspective view of the power operated forage apparatus in one typical installation.
Figure 2:
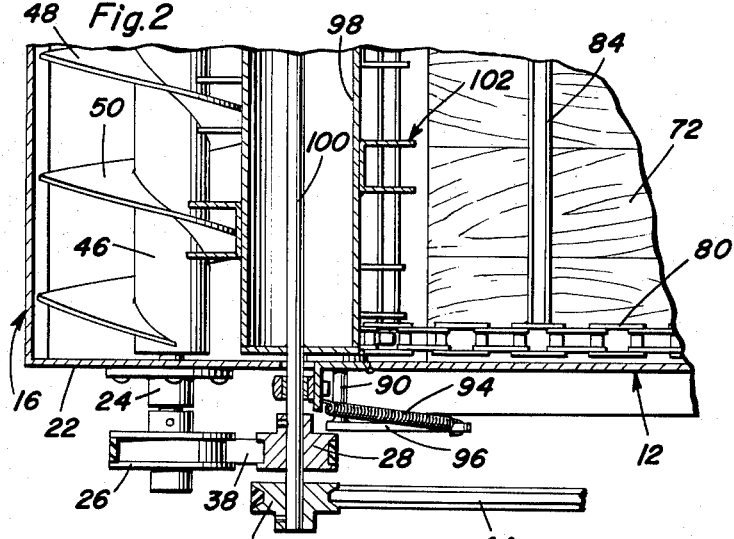
FIGURE 2 is a partial sectional view taken substantially through a plane indicated by section line 2—2 in FIGURE 1.

Referring now to the drawings in detail, it will be observed from FIGURE 1 that the power operated forage feeding apparatus generally referred to by reference numeral 10 is associated with a silage storing hopper or container 12 mounted on a vehicle frame assembly 14. The apparatus 10 is therefore provided with a casing or housing 16 attached to the unloading end of the container 12. The apparatus is also provided with a suitable drive mechanism such as the belt drive mechanism 18 powered by the vehicle power plant for example, through a power take-off pulley drum 20. One lateral side 22 of the casing 16 may therefore be provided adjacent its lower end with a journal assembly 24 for a cross feed drive pulley 26 while vertically spaced openings are formed in the side 22 through which shafts extend for drive pulleys 28, 30 and 32 to which material metering drums are connected. Idler pulleys 34 and 36 may therefore also be mounted between the drive pulleys maintaining proper tension on an endless drive belt 38 which is entrained about the drive pulleys and the idler pulley 40. The drive pulley 28 may also be connected to an input pulley 42 drivingly connected by the belt 44 to the power take-off pulley drum 20 whereby movement may be imparted to the various rotating parts of the apparatus. It will of course be appreciated that many other different and equivalent drive arrangements could be utilized.

Referring now to FIGURES 2, 3, 7 and 8 in particular, it will be observed that the cross feed drive pulley 26 is connected to a shaft journalled by the journal assembly 24, said shaft being connected to the elongated hub 46 of an auger member 48 having a spiral blade formation 50 which extends from the side 22 of the casing 16 through a lower trough formation 52 formed integral with the casing 16. The trough 52 is provided with an outlet end portion 54 opposite the side 22 of the casing. The auger member is therefore operative to displace material toward the outlet end portion 54 when driven in the proper direction by the pulley 26 through the belt drive 18. Peripherally mounted on the spiral blade formation adjacent the outward end of the trough, is a bearing element in the form of a hardened steel strip 56 as more clearly seen in FIGURES 7 and 8. The bearing strip 56 extends about the spiral blade formation periphery for at least 360° so as to be in continuous contact with an elongated replaceable bearing strip 58 that extends longitudinally along the bottom of the trough 52. Spaced fastener elements 60 are therefore provided on the bottom of the trough for holding the bearing strip 58 in place and facilitating easy replacement thereof. It will therefore be apparent, that the auger member 48 will be rotatably mounted at the outlet end of the trough yet will not significantly reduce the discharge area and will also facilitate repair and maintenance of the auger bearing facilities. Material deposited into the trough 52 will therefore be conveyed in a lateral direction toward the outlet end portion 54 of the trough. The material will be deposited into the trough on the other hand, by movement thereof in a rearward direction with respect to the vehicle frame 14 on which the container 12 is supported.

Figure 5:
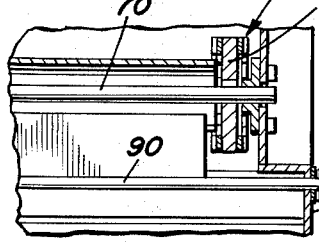
FIGURE 5 is a partial sectional view taken substantially through a plane indicated by section line 5—5 in FIGURE 3.

Movement of the material within the container 12 is effected by a conveyor mechanism generally referred to by reference numeral 62. As more clearly seen in FIGURES 2, 3 and 5, the delivery end portion of the conveyor 62 is supported above the cross channel members 64 and 66 and is provided with a material guide member 68 secured by the channel frame member 70 to the rear end of the wooden floor 72 of the container 12. The guide 68 forms a protective skirt about the shaft 74 rotatably mounted by the frame assembly 14 at the delivery end portion of the conveyor. Connected to opposite ends of the shaft 74 are sprocket wheels 76 about which endless sprocket chains 78 are entrained including upper run portions 80 extending above the floor 72 at the sides of the container and lower run portions 82 below the floor 72. Interconnected with the endless conveyor chains 78, and extending transversely across the floor 72, are fixedly spaced pusher elements 84 by means of which the material within the container is moved toward the delivery end portion of the conveyor from which it is deposited into the cross feed trough 52. The material guide member 68 is therefore closely spaced above the trough 52 so that the material will be pushed thereinto by the pusher elements 84. However, there is a small gap 86 necessarily disposed between the guide member 68 and the trough so that the pusher elements 84 may be returned beneath the floor 72 of the container toward the forward end thereof.

In order to avoid loss of material through the gap, a transversely extending flap member 88 is provided pivotally mounted by the shaft 90 which is rotatably mounted by the side frame members 92 of the frame assembly 14. The flap member 88 is biased to the position shown in FIGURE 3 by springs 94 anchored to the frame and secured to the ends of lever elements 96 secured to the ends of the shaft 90 which project through the side frame members 92. Thus, the flap member 88 will be in engagement with the lower edge of the guide member 68 and up against the cross channel frame member 64 to which the trough 52 is secured. The gap 86 will therefore be closed except when the flap member 88 is pivotally displaced against the bias of the springs 94 to the position illustrated in FIGURE 4 out of the path of the movement of the pusher elements 84. Thus, the flap member 88 will be intermittently displaced to the position illustrated in FIGURE 4 so as to permit passage of the pusher elements, but will immediately return to the position illustrated in FIGURE 3 in order to prevent spillage or loss of material through the gap 86.

Figure 6:
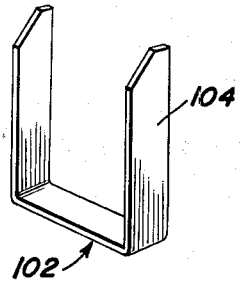
FIGURE 6 is a perspective view of one tooth element utilized in the apparatus.

Deposit of the material from the conveyor 62 into the trough is regulated by a plurality of metering drums driven by the drive pulleys 28, 30 and 32, as hereinbefore indicated. The drums are therefore rotatably mounted in vertically spaced relation above each other and just above the delivery end portion of the conveyor. Passages will therefore be formed between the metering drums including a lower metering passage through which the material is restrictively discharged into the trough. At least two of the lower metering drums are of a substantial diameter or circumference so as to avoid the wrapping of large grasses thereabout. For example, the lower metering drum 98 is hollow and connected to a drive shaft 100 extending therethrough, said drive shaft extending through the casing side 22 at one lateral end for connection to the drive pulley 28 as more clearly seen in FIGURE 2. Also, secured to the external periphery of the drum 98, are a plurality of beating elements 102 which moves through the metering passage in the direction of material movement as shown by the arrows in FIGURE 6. Each element 102 is therefore provided with a pair of radially projecting teeth 104 interconnected at the base so that they may be secured as by welding to the peripheral surface of the drum 98. Accordingly, each drum will be provided with circumferentially and axially spaced beater teeth whereby the movement of the material through the metering passage is facilitated. It will also be observed from FIGURES 1 and 3, that the beating elements 102 are so arranged in an axial direction as to form a spiral formation. In this manner, the teeth will engage the material at an angle to the direction of movement by the conveyor 62 so as to prevent sudden loading of the metering drums 98 and overloading of the cross feed auger member 48. Also, the teeth elements will cut any long grasses so as to prevent winding about the metering drums. It will therefore be apparent, that the foregoing arrangement permits regulated deposit of material into the cross feed trough 52 without any abrupt change in loading and without any wrappings about the metering drums or driveshaft 100 enclosed therewithin. Clogging and stoppage of the mechanism is thereby avoided.

From the foregoing description, the construction, operation and utility of the material handling apparatus will be apparent. It will therefore be appreciated, that material may be conveyed in one direction toward a delivery end of a container and deposited in a regulated manner in view of the use of relatively large diameter metering drums on which the beater teeth are mounted in a spiral arrangement operative to rake and shear the material at an angle to the movement of the material preventing abrupt loading of the metering drums and overloading of the cross feed into which the material is deposited. Accordingly, beater teeth are utilized which are relatively short as compared to the metering drums or preferably less in length than the radius of the associated metering drum. The amount of material deposited in the cross feed may thereby be gauged and clogging prevented. Also, the cross feed mechanism is so arranged in association with the conveyor as to avoid loss of material through the gap 86 by means of the intermittently displaced flap member 88. Finally, operation of the apparatus and maintenance thereof is enhanced by the provision of a peripheral bearing strip 56 at the discharge end portion of the auger feed cooperating with a replaceable elongated bearing strip 58 at the bottom of the trough.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A material handling apparatus comprising, a conveyor having a delivery end portion, a trough mounted at said delivery end portion for receiving material deposited by the conveyor, material feeding means movably mounted in said trough having a discharge end on which the material is fed through the trough, metering means operatively mounted in spaced relation to the conveyor for rotation in one direction tending to displace material into the trough through a metering passage at the delivery end of the conveyor, and material beating means mounted on said metering means for progressive engagement with said material to prevent abrupt loading of the metering means and overloading of the feeding means, said metering means comprising a plurality of drums mounted for rotation in the same direction about fixedly spaced axes spaced from the conveyor to form said metering passage at the discharge end portion of the conveyor restricting movement of the material into the trough, said beating means comprising a plurality of spaced teeth mounted on said drums for movement of the teeth on one of said drums through the metering passage in the direction of movement of the material by the conveyor, said teeth being of equal length shorter than the radii of the respective drums, said material beating means comprising an auger member, peripherally mounted bearing means secured to the auger member at the discharge end for rotatable mounting thereof in the trough, and an elongated bearing strip fixedly mounted in the trough for bearing contact with said peripherally mounted bearing means, said conveyor including, material guide means at the delivery end portion spaced from the trough to form a gap, material pushing elements movable in the direction of material movement through said gap for displacing said material into the trough and means intermittently displaced out of the path of movement of the pushing elements for closing said gap between the guide means and the trough to prevent loss of material therethrough.

2. A material handling apparatus comprising, a conveyor having a delivery portion, a trough mounted at said delivery portion of the conveyor and having an open discharge end extending laterally beyond the conveyor, a material feeding member mounted within the trough for displacing material toward said discharge end of the trough, upper and lower metering drums, means rotatably mounting said drums in vertically spaced relation above the conveyor at the delivery portion to form a metering passage between the conveyor and the lower metering drum, means drivingly connected to the metering drums for rotation thereof in the same direction tending to displace the material through said metering passage, radially extending teeth mounted on said metering drums for movement in the direction of material movement through the metering passage to regulate deposit of the material into the trough, said drums being larger in radius than the length of said teeth, peripheral bearing means for supporting the material feeding member only at said discharge end of the trough to avoid obstruction of the flow of material through the trough and gap closing means pivotally mounted for engagement with the conveyor at the delivery portion to prevent loss of material, said gap closing means including a rigid flap element, and spring means biasing the flap element into engagement with the conveyor opposing intermittent displacement thereof by the conveyor.

References Cited by the Examiner

UNITED STATES PATENTS

| | | | |
|---|---|---|---|
| 1,684,254 | 9/28 | Bailey | 198—213 |
| 2,475,590 | 7/49 | Carbert | 214—83.36 X |
| 2,676,002 | 4/54 | Wolfe | 214—519 X |
| 2,682,959 | 7/54 | Regier | 214—83.36 |
| 2,743,832 | 5/56 | Kappelmann | 214—519 |
| 2,818,165 | 12/57 | Dupps | 198—213 |
| 3,063,723 | 11/62 | Toft | 214—519 X |
| 3,084,821 | 4/63 | Knight | 214—519 |

HUGO O. SCHULZ, *Primary Examiner.*

GERALD M. FORLENZA, *Examiner.*